Patented Oct. 2, 1934

1,975,399

UNITED STATES PATENT OFFICE 1,975,399

PROCESS FOR THE MANUFACTURE OF MOLDING SAND MORE PARTICULARLY SUITABLE FOR THE CONFECTION OF CORES AND STONE BED MOLDS

Jean Amédée Malaspina, Vitry-sur-Seine, France

No Drawing. Application August 17, 1932, Serial No. 629,188. In France August 25, 1931

2 Claims. (Cl. 22—188)

The object of my invention is a process of manufacture of molding sand, specially suitable for the making of cores and stone bed molds, able to hold very rapidly by itself and showing, when hardened, a great cohesion as well as a great strength after being baked in an oven, so permitting reduction in the number of braces and frames of cast and therefore facilitating the lifting operations.

This sand is remarkable because cores made with it need no ramming and it may be used with advantage for the making of stone bed moldings, flask moldings and template moldings.

The sand according to my invention is composed of a mixture of preferably middle size grained dryed white sand with flake white, to which are added substances such as manganese dioxide and cooked linseed oil for agglomerating and binding, potassium or sodium carbonate intended to clean and scour the sand, Glauber salt or sodium chlorate or potassium sulphate or potassium chlorate or any other substances which singly or in combination accelerate the setting, and further a varnish mixed with a drying substance to assist the holding of the molds or cores before baking.

I am aware that processes of manufacture of molding cores are known using white sand mixed with manganese dioxide and linseed oil but in these known processes, the sand is, previously to its admixture with other ingredients, heated to a relatively high temperature. The warming up of the manganese dioxide and linseed oil caused by their admixture with hot sand assists indeed the subsequent holding of the mixture but when subsequently baked, the mixture in the molds or cores is subjected to a second warming during which the mixture of manganese dioxide and linseed oil softens so that, in spite of the bars and braces they contain, the cores yield, bend or sag and must therefore be supported or propped. They need even occasionally be placed, while being baked, in drying shells and since baking must be effected at high temperature, it often happens that the molding pieces are burnt in the oven.

According to the process forming the object of my invention, the sand, previously to its mixing, must be thoroughly dried and deprived of any moisture, and when employed, it must be cold. The substances contained in the mixture and intended to make it set and harden, impart to the cores and stones a great strength which permits use of a fewer number of lighter and simpler braces or frames of cast. They further insure a perfect standing of the cores, without propping or supporting or shelling during the baking, which besides, is effected at relatively low temperature.

The process further allows a great sparing of linseed oil.

By way of example, a sand mixture according to my invention may be composed in the following manner:

50 litres of preferably mean sized grained dry siliceous white sand, 135 grammes of powdered manganese dioxide, 1½ litres of linseed oil cooked with 1½ grammes of manganese dioxide, 125 grammes of Glauber salt (or sodium chlorate or potassium sulphate or chlorate), ½ litre of varnish preferably made of a solution of copalgum or gummilac in alcohol, 125 grammes dryer, preferably in the form of a solution of manganese borate or carbonate or resinate in turpentine, 125 grammes potassium or sodium carbonate, are thoroughly mixed together for about thirty minutes. The said proportions of these ingredients are those that produce the best results.

To the aforesaid well stirred mixture, are added about 160 grams of flake white.

This new mixture is again stirred for 5 minutes and is then ready for use. It must be used immediately, for it sets very quickly. The core boxes or whatever molds or frames to be used must therefore be previously prepared.

When molding, the mixture need not be rammed, because in setting, it acquires by itself sufficient cohesion and strength. The complete stiffening or setting takes place during a curing period, for instance, of two hours for small cores, four hours for medium sized ones, and up to twelve hours for very large ones.

After curing, the cores or other moldings are baked. This baking is preferably effected at an increasing temperature starting from 80° C. to go up to 210° C. Baking should last about 3 hours after which the cores, or other moldings are left to cool.

They may be then spread, either by means of a soft brush, or of a pneumatic spray, with a glaze made for instance of a mixture of: 4 litres of plumbago black, 6 litres of water, 1 litre of a solution of 30 grams of sodium silicate in water.

The cores and other moldings are then ready to be set in place in the molds and the pouring operation can be immediately carried out.

The above named substances have been selected, considering their properties, in order to perform precise effects, as hereafter explained, as well in the preparation of the mixture as in the making of the cores and other mold parts, in the baking, the pouring and cooling of the metal, as well as when cleaning the casting and recuperating the sand.

Only siliceous white sand shall be used, for it is the only sand which thoroughly allies with the other substances. Besides it is cheaper and generally available in the vicinity of all foundries.

Pyrolusite, i. e. manganese dioxide forms with linseed oil an agglomerator or binder of the sand grains. Linseed oil, when admixed and cooked with a small quantity of manganese dioxide, yields a product having a much greater affinity for powdered manganese dioxide than pure cooked linseed oil, whence the agglomerating or binding power is much increased, and relatively less linseed oil is needed.

Glauber salt, sodium chlorate, potassium sulphate or chlorate through their catalytic action on the linseed oil and manganese dioxide mixture, accelerate the setting or stiffening.

The alcoholic varnish is an agglutinator, whose drying is speeded up by the addition of a large quantity of dryer. It acts as a primary agglomerator of the mixture by reason of its quick drying and insures keeping the shape of the mold parts up to the completion of setting or stiffening of the mixture of linseed oil with manganese dioxide.

Potassium or sodium carbonate insure the cleaning and scouring of the sand grain surfaces and thence the more intimate contact of the agglomerators and agglutinators thereto. Either one therefore assists in the perfect agglomeration or binding of the mixture.

Flake white, considerably increases the agglomerating or binding power of the mixture by reason of its well known affinity for linseed oil in forming putty.

The mixture is conveniently spread by hand over all molding surfaces in the molds or core boxes; but it is not rammed. The flasks, core boxes or other molds are then filled with the same mixture, without ramming, then straightened with a leveling rule. When and where needed, a few light bars or braces may be placed.

As the mixture is not rammed in the frames, no sweating of linseed oil can take place on the pattern surfaces due to an excessive local compression by a tamper or other ramming tool. The adherence of the sand to the patterns, core boxes or other molding parts is thus obviated as well as the flaws caused by the localization of excess oil on the molding surfaces.

When large flask molding has to be performed, a layer of 5 to 10 centimetres thickness is first uniformly spread over the whole surface of the pattern; this layer is then slightly pressed by hand and covered with ordinary molding sand, which in turn is moderately rammed with a rather wide tamper or ramming tool or with the molding machine until the flask is completely full.

When template molding is to be performed, the molding mixture is laid over a stiff metal plate, lightly pressed by hand and roughly formed to the desired shape, then trimmed with the template strickle.

Obviously, this process can only be carried out in connection with molds, mold parts or cores that can be ovened.

While curing, the mixture needs no watching nor any special care.

When the cores or other molds are ready for baking, they are hard and very strong, and keep very well their shape without propping or any supporting means and are easily and harmlessly handled. They can be readily filed, sawed, cut or otherwise worked out without splitting, chipping or breaking.

The low temperature at the beginning of the baking is not sufficient to increase quickly the fluidness of the linseed oil or cause the fast softening of the manganese dioxide; this low heat however, promotes the drying of the already hard mixture in a very favorable way as regards the keeping of the shapes and dimensions.

In spite of the softening action of the baking heat on the manganese dioxide, and its increasing the fluidity of the linseed oil, which might reduce the strength of the molds or mold parts being baked and might cause them to sag under their own weight, sufficient strength is imparted by the binding exerted by the dried varnish to withstand any deformation because the varnish, already dry and firm, increases in hardness under the action of heat and sustains the whole mass.

The rather low initial baking heat has for further effect to strengthen the agglomerating power of flake white.

Linseed oil and manganese dioxide undergo, in proportion of the heat absorption, a cooking which imparts them with an unalterable hardness insuring, after baking, the greatest strength to the mold elements.

Owing to the fact that the baking process begins at a rather low temperature, which is progressively increased, without however reaching the values practiced in the usual art for manganese dioxide sand mixtures, the hardening of the mold elements takes place more quickly and in most favorable conditions for the shape preservation.

Owing to the fact that the baking temperature is not raised over 210° C., the linseed oil is not destroyed and the molds, cores, etc. are not burnt.

The baking heat being made to increase progressively penetrates more easily and at a sensibly uniform rate throughout the mass of the molds, cores etc. being baked.

After cooling, these are very strong and neat, showing no cracks nor breaks. They can be easily filed, cut, sawed and otherwise worked without breaking and handled without damage.

The glaze with which they are coated fills all the pores of the molding surfaces and makes them soft and glazed.

Sodium silicate being an agglutinator, sticks firmly the plumbago black onto all molding surfaces; the water, remaining at the surface, soon disappears by evaporation.

The molds, cores and other mold parts made in such a way do not absorb moisture and water splashed against them penetrates but very little and cannot damage them.

Since the mixture has not been rammed, molds, cores and other mold parts are very light; thus their handling in the other molding operations is made much easier.

All elements made according to the above described process withstand successfully the shocks and weight of the flowing molten metal, without dragging out any sand grains.

All narrow spaces are well filled, and sharp edges followed by the metal. No steam is generated, because the mixture, made by a dry process, contains no water. No poisonous gas is generated, because linseed oil and the gums of the varnish have already been deprived, by the high temperature in the baking process, of all gases susceptible to being freed by heat.

As the molds, cores and other mold parts have not been rammed, they are not dense, and though strong, are relatively porous and hence absorb the small quantity of gases eventually generated by the action of the high temperature of the molten metal, before its solidification. No pitting, pin holes or blow holes occur therefore and no air holes are needed.

When cooling, the metal shrinks freely and no abnormal stress occurs because the molds, cores and other mold parts have no resistance and yield to the pressures caused by the shrinking metal. Under the action of the great heat prevailing, the mixture changes from the firm agglomerated state into a powdery one, therefore the lifting of the casting and emptying of the core holes is greatly facilitated. No part whatever of the molds sticks against the casting, the latter is found to be very smooth and shows a fine appearance and color, whatever be the cast metal.

These properties result from the pickling action of the potassium or sodium carbonate exerted on the hot metal, even through the glazing.

The whole of the sand contained in the mixture can be reclaimed and used again after being added with fresh white sand and the named substances.

Having thus disclosed my invention and stated its advantages, named the used substances and stated the most efficient proportions thereof to be employed, explained their functions in all phases of the process,

I claim:

1. A process of producing molding sand particularly suitable for making cores and stone bed molds and comprising the thorough mixing of cold, middle-sized dry siliceous white sand with manganese dioxide, cooked linseed oil and Glauber salt as setting accelerator of the mixture of linseed oil and manganese dioxide, varnish, varnish dryer, sodium carbonate as scouring agent, and submitting this mixture to a second stirring with flake white.

2. A process of producing molding sand particularly suitable for making cores and stone bed molds, and comprising the thorough mixing during 30 minutes, of 50 litres dry white siliceous sand with 135 grammes of powdered manganese dioxide, 1½ litres linseed oil cooked with 1½ grammes manganese dioxide, 125 grammes Glauber salt, ½ litre varnish, 125 grammes varnish dryer, 125 grammes sodium carbonate, then adding 160 grammes flake white and stirring again for 5 minutes.

JEAN AMÉDÉE MALASPINA.